Oct. 25, 1932.  A. E. WEINGARTNER  1,884,437

STEERING GEAR SYSTEM

Filed Nov. 3, 1927  13 Sheets-Sheet 1

Oct. 25, 1932.  A. E. WEINGARTNER  1,884,437
STEERING GEAR SYSTEM
Filed Nov. 3, 1927  13 Sheets-Sheet 2

Oct. 25, 1932.   A. E. WEINGARTNER   1,884,437
STEERING GEAR SYSTEM
Filed Nov. 3, 1927    13 Sheets-Sheet 5

Fig. 7.

Oct. 25, 1932.  A. E. WEINGARTNER  1,884,437
STEERING GEAR SYSTEM
Filed Nov. 3, 1927   13 Sheets-Sheet 7

Inventor:-
Anthony E. Weingartner.
by his Attorneys
Howson & Howson

Oct. 25, 1932.  A. E. WEINGARTNER  1,884,437
STEERING GEAR SYSTEM
Filed Nov. 3, 1927   13 Sheets-Sheet 8

Fig. 10.

Inventor:-
Anthony E. Weingartner,
by his Attorneys.
Howson & Howson

Oct. 25, 1932.　　A. E. WEINGARTNER　　1,884,437
STEERING GEAR SYSTEM
Filed Nov. 3, 1927　　13 Sheets-Sheet 11

Fig.13.

Inventor:
Anthony E. Weingartner,
by his Attorneys,
Howson & Howson

Oct. 25, 1932.  A. E. WEINGARTNER  1,884,437
STEERING GEAR SYSTEM
Filed Nov. 3, 1927   13 Sheets-Sheet 13

Inventor:-
Anthony E. Weingartner
by his Attorneys.
Howson & Howson

UNITED STATES PATENT OFFICE

ANTHONY E. WEINGARTNER, OF BETHLEHEM, PENNSYLVANIA, ASSIGNOR TO AMERICAN ENGINEERING COMPANY, OF PHILADELPHIA, PENNSYLVANIA, A CORPORATION OF PENNSYLVANIA

STEERING GEAR SYSTEM

Application filed November 3, 1927. Serial No. 230,781.

My invention relates to fluid-power apparatus, and it has particular relation to steering-gear control systems.

Since it is of vital importance that the steering-gear of a moving vessel remain in perfect operating condition at all times, it is necessary to provide spare units. For example, should an active pump unit fail for any reason, it becomes immediately necessary to replace this unit by a spare unit with a minimum expenditure of time and effort. The use of spare units, however, complicates very much the operation of the system, and it renders the change over from the damaged unit to the spare unit extremely hazardous, since, if wrong connections are made, the steering-gear as a whole may be wrecked with consequent loss of control of the vessel.

One object of my invention, therefore, is to provide means, whereby the spare unit of a fluid-power system may be quickly, safely and accurately connected in the place of a damaged unit and the proper relation of the new unit with the rest of the apparatus assured.

A more specific object of my invention is to provide means, whereby a predetermined relation may be maintained between a power device and its distributing-valve apparatus for different positions of the power-apparatus control means.

Another object of my invention is to provide means, whereby operating means may be connected to the control means of a pump substantially simultaneously with a predetermined adjustment of the pump distributing-valve apparatus.

A further object of my invention is to provide means, whereby a predetermined operating relation may be assured at all times between the pump-control element, the operating means for the control element, the distributing-valve apparatus and the driving means for the pump.

A still further object of my invention is to provide apparatus of the character described comprising a pair of pumps, control means for the pumps, distributing-valve apparatus and mechanically interlocked control means for the distributing-valve apparatus and the pump-control means, so that a predetermined operating relation between these parts may be assured.

A still further object of my invention is to provide an interlocking mechanism for a pair of pumps, a distributing-valve and a pilot control, in a steering-gear system of the general type disclosed in the United States patent of Anthony E. Weingartner and George E. Smith, No. 1,656,028, dated Jan. 10, 1928, and assigned to the American Engineering Company.

Other objects and applications of my invention, as well as details of construction and operation, whereby my invention may be practiced, will be apparent more fully hereinafter, when taken in connection with the accompanying drawings, wherein.

Referring to the drawings, the structure therein disclosed comprises broadly fluid-motor apparatus 1; a pair of port and starboard pump units 2 and 3 respectively; control means 4 and 5 for the pump units 2 and 3 respectively; pilot-motor operating means 6 for the control means 4 and 5; distributing-valve apparatus 7 which is connected to the pump units 2 and 3 by piping 8 and to the fluid-motor apparatus 1 by piping 9; and means 11 whereby the pilot-motor operating means 6 may be selectively connected to the pump control means 4 and 5 and the distributing-valve apparatus 7 so operated as to assure at all times a desired working relation between the pump units 2 and 3, the distributing-valve apparatus 7 and the fluid-motor apparatus 1.

Figure 1:
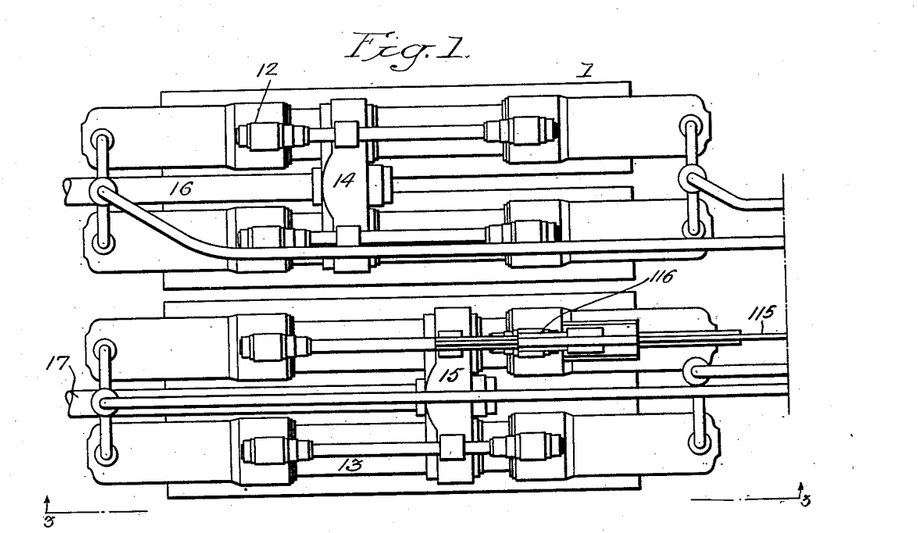
Fig. 1 is a top plan view of the fluid-motor end of a hydraulic steering-gear system embodying my invention.
Figure 2:
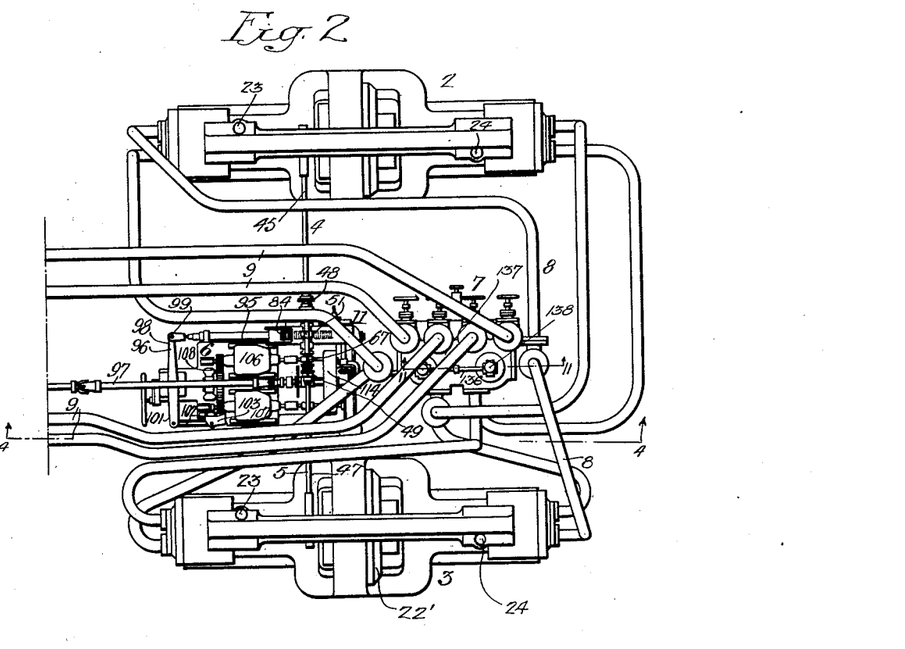
Fig. 2 is a view similar to Fig. 1, but showing the pump end of the system.
Figure 3:
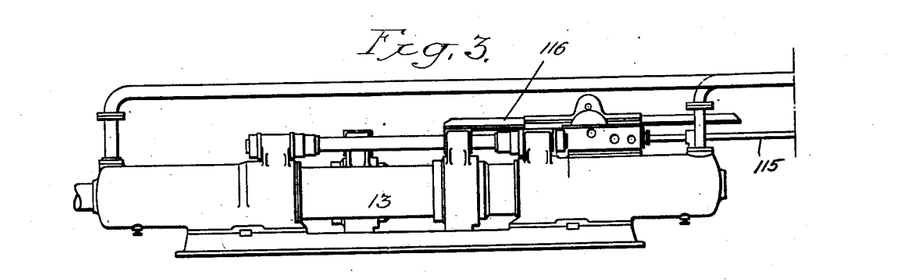
Figs. 3 and 4 are vertical sectional views taken on the lines III—III and IV—IV of Figs. 1 and 2, respectively, the piping, however, being omitted.
Figure 4:
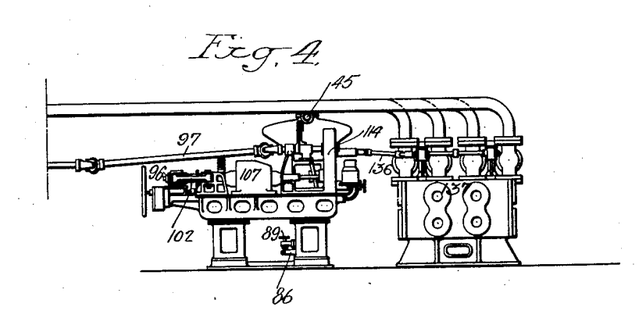

Referring to the fluid-motor apparatus 1, of which Figs. 1 and 3 are top plan and side elevational views, respectively, pairs of fluid-motors 12 and 13 are respectively connected by cross-heads 14 and 15 and linkage 16 and 17 to a member (not shown) to be oscillated, say, for example, a rudder post. The motive fluid may be supplied by one or the other of the pump units 2 and 3 to the fluid-motors 12 and 13, depending upon the adjustment of the several valves constituting the distributing-valve apparatus 7, all as will presently appear in greater detail. The pump units 2 and 3 are identical in design, so that only the port unit 2 will be described in detail.

Figure 9:
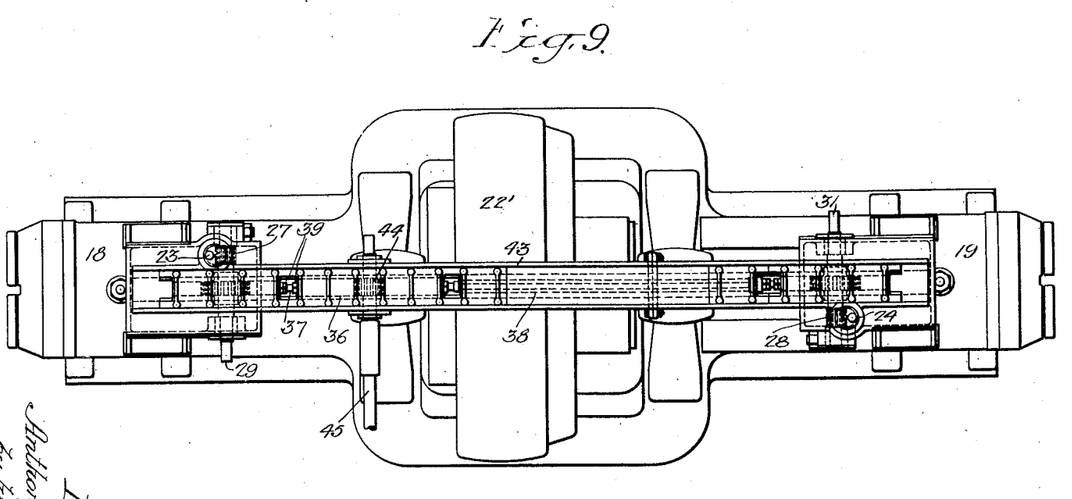
Figs. 9 and 10 are top and side elevational views, respectively, of one of the pump units and associated stroke-controlling means.
Figure 10:
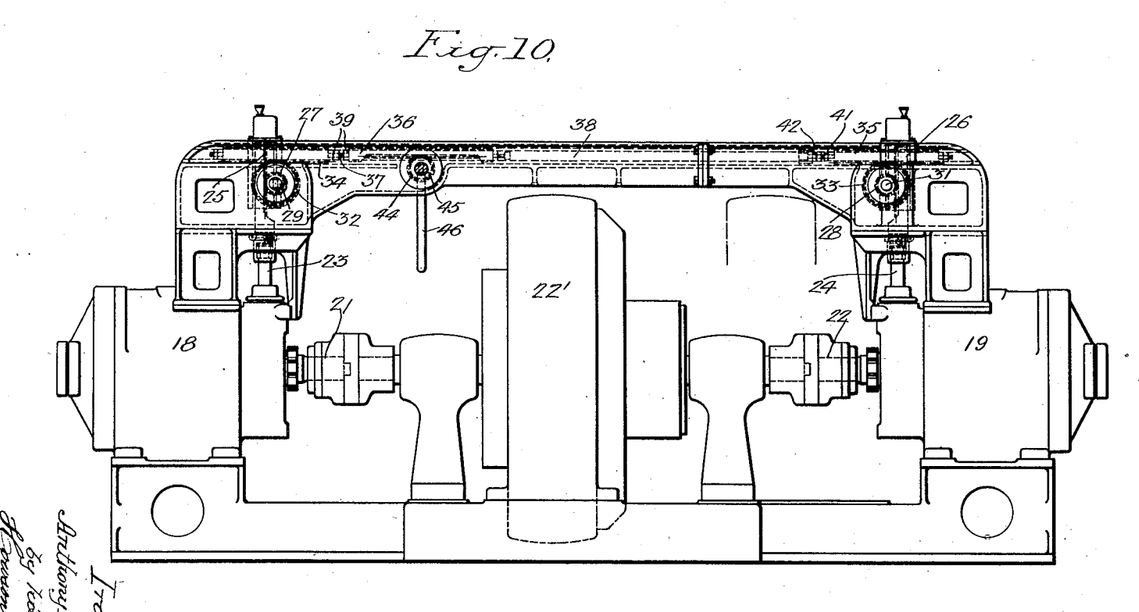
Figure 11:
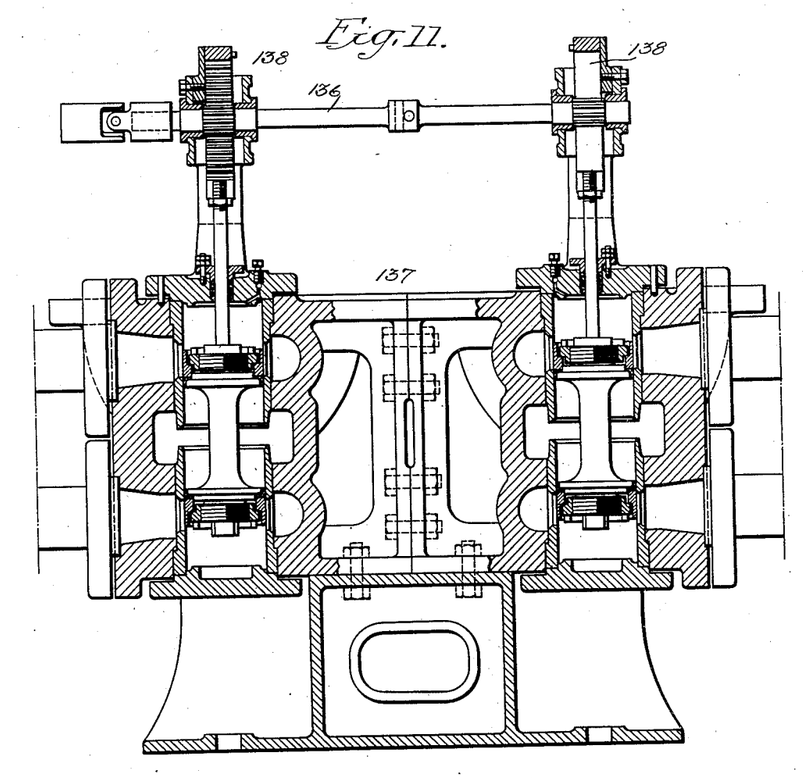
Fig. 11 is a vertical sectional view of the distributing-valve apparatus, the sectional plane being taken on the line XI—XI of Fig. 2.

Referring to Figs. 9 and 10, it is noted that a pair of variable-capacity pumps 18 and 19 are respectively connected by shafts 21 and 22 to a common electrical driving motor 22'. The stroke of the pumps 18 and 19 is controlled by vertically movable spindles 23 and 24, corresponding upper ends of which are provided with rack portions 25 and 26. The rack portions 25 and 26 engage pinions 27 and 28 which are respectively mounted on shafts 29 and 31. These shafts also carry pinions 32 and 33 which mesh with aligned horizontal rack sections 34 and 35, respectively. The rack section 34 is adjustably secured to a rack section 36 by means of a single bolt 37 which extends longitudinally through both sections and terminates in a member 38, a plurality of nuts 39 being mounted on the bolt 37 so as to permit longitudinal adjustment of either of the rack sections 34 and 36.

A second bolt 41 extends from an opposite end of the member 38 through the rack section 35, which co-operates with the pinion 33, and it is provided with a plurality of nuts 42, whereby the section 35 may be adjusted independently of the member 38. The members 34, 36, 38 and 35 are slidably mounted on a common supporting member 43 and may be simultaneously operated by a single pinion 44 which is in mesh with the rack section 36 and mounted on an elevated, transversely extending clutch shaft 45. Manual adjustment of the shaft 45 may be effected by means of a handle 46. When the handle 46 is in the vertical position shown in Fig. 10, the pump-control spindles 23 and 24 are in their neutral position, so that no fluid is being delivered by the pumps. However, when the handle 46 is moved from its vertical position, the spindles 23 and 24 are so actuated as to cause the stroke of the pumps to increase from zero to a value sufficient to permit the desired fluid-power to be supplied to the fluid-motors 12 and 13 in the desired direction.

In accordance with my invention, shaft 45, which extends from the pumping unit 2, and a shaft 47, which extends from the pumping unit 3, are selectively connected to the pilot-motor control means 6 through clutches 48 and 49 respectively, and a gear-wheel mechanism 51. As illustrated, particularly in Fig. 12, the clutch 48 comprises a part 52, which is mounted on the end of the shaft 45, and a part 53 which is mounted on an intermediate shaft section 54 journaled in a supporting housing 55. The clutch part 52 is provided with teeth 56 and 57 which fit in recesses 58 and 59 of the clutch part 53 when the clutch is closed. The tooth 57 and its associated recess 59 are preferably smaller than the tooth 56 and its associated recess 58, thereby preventing the closing of the clutch 48 when these parts have moved through an angle of 180 degrees. Should the clutch 48 close for such movement, then the desired predetermined operating relation between the distributing-valve apparatus 7 and the pumping units 2 and 3 would be interrupted, with consequence damage to the steering-gear system as a whole. The parts are so adjusted that the clutch 48 may be closed by the interlocking of the teeth 56, 57 and the recesses 58, 59 only when the control stems 23 and 24 of the pumps 18 and 19 are in the neutral position shown in Fig. 10.

Figures 12, 13A:
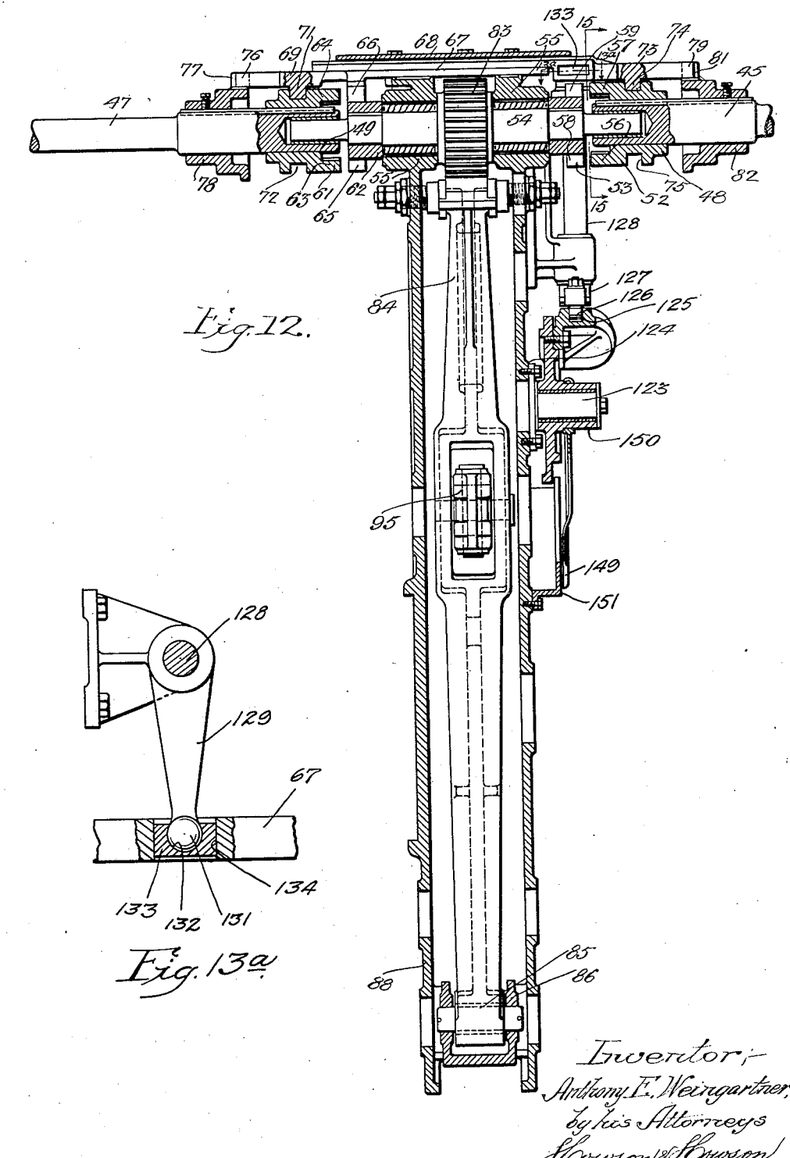
Fig. 12 is an enlarged detail vertical sectional view of the clutch-shifting mechanism and associated parts, the sectional plane being taken on the line XII—XII of Fig. 13.
Fig. 13a is a fragmentary sectional view on the line 13a, 13a, Fig. 12, illustrating a mechanical detail.

The clutch 49 is similar in design to the clutch 48, comprising clutch parts 61 and 62 which are respectively mounted on the end of the clutch shaft 47 and the intermediate shaft section 54. The clutch part 61 is provided with teeth 63 and 64 which co-act with recesses 65 and 66 in the clutch part 62. The tooth 64 is smaller than the tooth 63, so that the closing of the clutch 49 may be prevented when the clutch shaft 47, which operates control spindles 23 and 24 of the unit 3, are other than in their neutral position. The clutch parts 52 and 61 of the clutches 48 and 49, respectively, are slidably mounted on their supporting shafts 45 and 47, and they may be simultaneously actuated by means of a clutch shifter 67. The clutch shifter 67 is slidably mounted in an upper portion 68 of the housing 55 for movement longitudinally of the aligned shaft sections 45, 47 and 54.

One end 69 of the clutch shifter 67 is provided with a forked portion 71 which loosely engages a circular recess 72 in the clutch part 61. An opposite end 73 of the clutch shifter 67 is similarly provided with a fork 74 which fits an annular groove 75 in the clutch part 52. The several clutch parts, as well as the shifter 67, are so adjusted that when the shifter is in the neutral position shown in Fig. 12, the clutches 48 and 49 are disengaged, the clutch 48 only being closed when the clutch shifter 67 is moved to the left, as viewed in Fig. 12, and the clutch 49 only being rendered effective when the clutch shifter is moved to the right. Thus the control means 4 and 5 of the port and starboard pumping units 2 and 3 may be successively, but not simultaneously connected to the common operating shaft section 54.

Another feature of my invention is the provision of means, whereby the control means 4 and 5 may be mechanically locked in position when their control clutches 48 and 49 are disengaged or ineffective. Accordingly, I so extend the end 69 of the clutch shifter 67 as to provide a shoulder 76, which fits in a recess 77 in a collar 78 mounted on the shaft 47 only when the clutches 48 and 49 are disengaged, as shown in Fig. 12, or when the clutch 49 is disengaged and the clutch 48 is engaged. It is also noted that the pump spindles 23 and 24 for the pumping unit 3 are in their neutral position when the clutch shaft 47 is locked by the positioning of the shoulder 76 in the recess 77.

The clutch shaft 45 is similarly locked in position, when the pump spindles 23 and 24 of the unit 2 are in the neutral position, by means of a shoulder extension 79 from the end portion 73 of the clutch shifter 67, this shoulder portion fitting in a recess 81 formed in a collar 82 mounted on the clutch shaft 45. The shoulder 79 is disposed in the recess 81 only when the clutch 48 is disengaged or when both the clutches 48 and 49 are ineffective, as shown in Fig. 12. Thus, the clutches 48 and 49 are mechanically interlocked by means of the clutch shifter 67 and are operated in such manner that both clutches are simultaneously disengaged or only one clutch is engaged at the same time. The clutch shifter 67 also causes the positive locking of both of the clutch shafts 45 and 47 when the clutches 48 and 49 are open or the locking of one clutch shaft simultaneously with the engagement of the clutch associated with the other clutch shaft.

My invention also contemplates the use of a pair of gear-wheels 83 and 84 between the pump-control means 4 and 5 and the pilot-motor operating means 6, one of the gear-wheels being mounted for bodily movement relative to the other, whereby the connection between the operating means 6 and the control means 4 and 5 may be so disconnected as to permit independent hand operation of the pump-control means 4 and 5. As shown particularly in Fig. 12, the gear-wheel 83 is mounted on the intermediate shaft section 54. The gear-wheel 84 is shown as a quadrant with pivotal mounting 85 on a bodily adjustable frame 86. The frame 86 is pivoted at one end 87 in a housing 88 for the quadrant 84. The frame 86 may be adjusted vertically by a hand wheel 89 which is mounted on a threaded end 91 of a link 92 extending from an end portion 93 of the frame 86 through a supporting frame portion 94. When it is desirable to render ineffective the pilot-motor operating means 6, the hand wheel 91 is so turned as to cause the lowering of the pivoted frame 86 and, consequently, the disengagement of the quadrant 84 and the gear-wheel 83.

Figure 5:
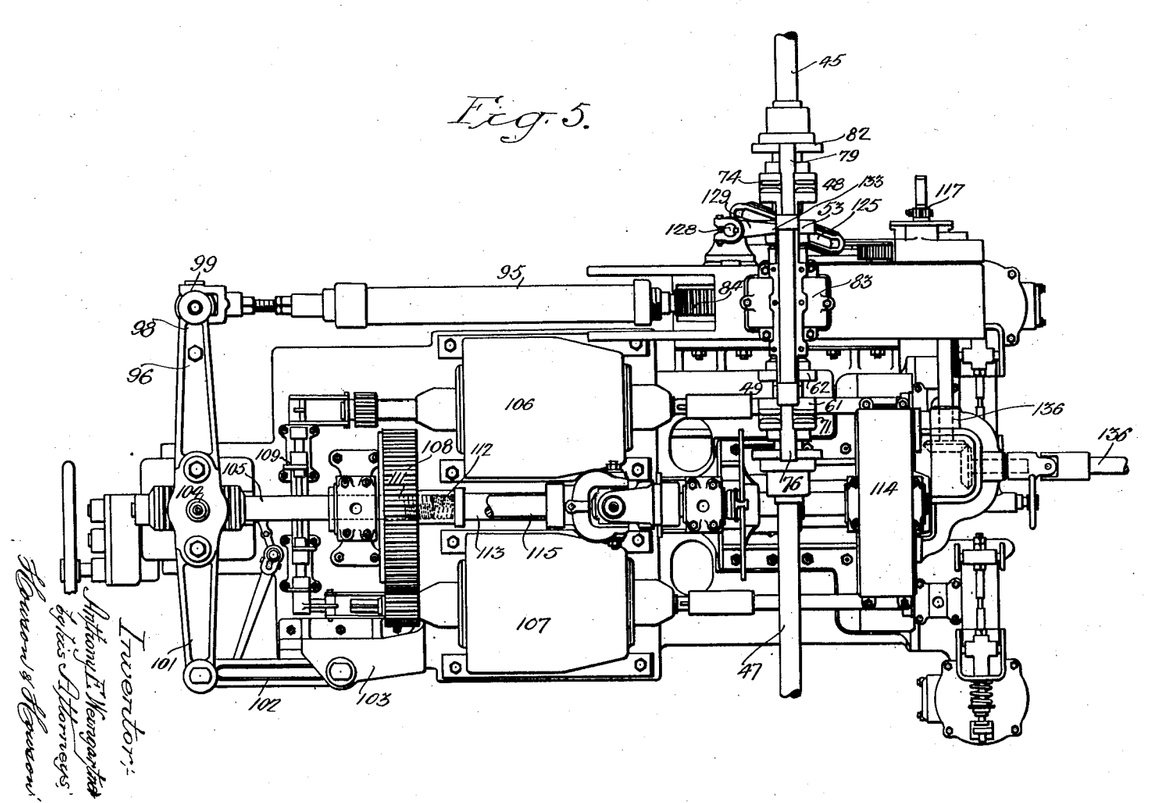
Fig. 5 is an enlarged, detail top plan view of the pilot-motor control and the clutch-shifting mechanism shown in Figs. 2 and 4.
Figure 6:
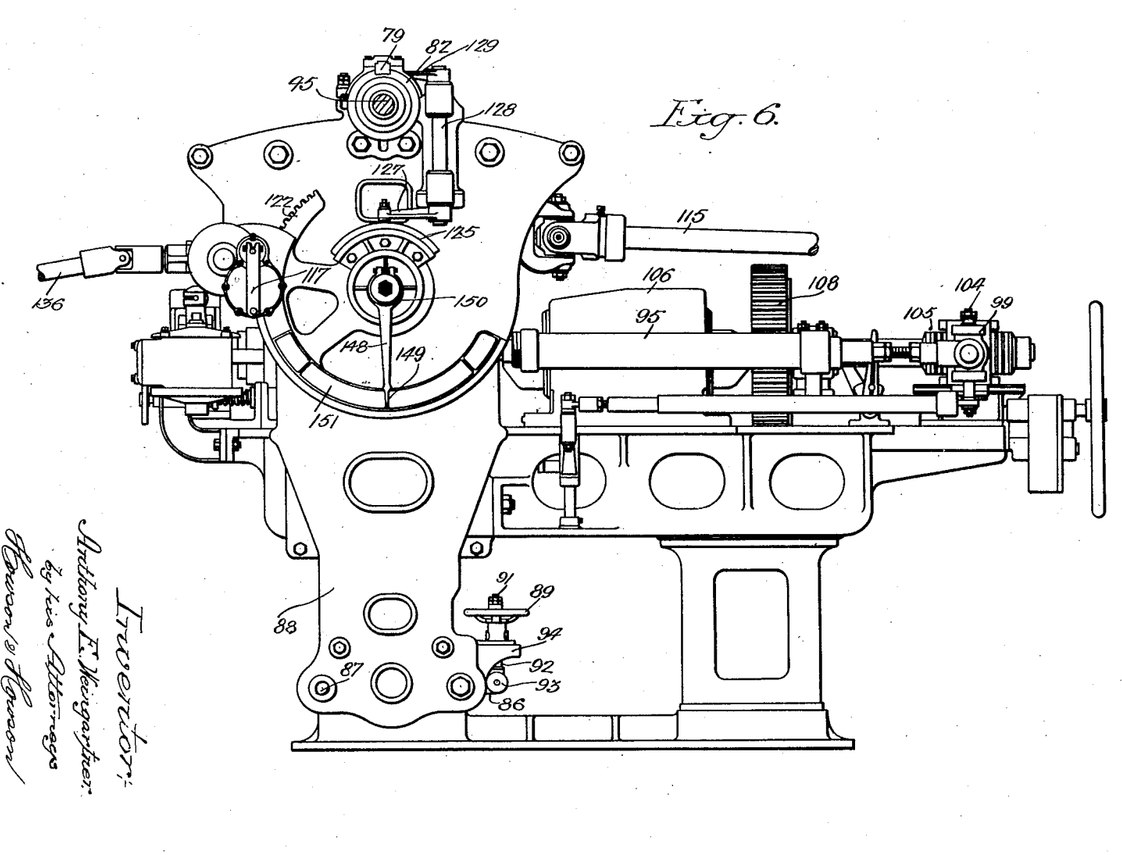
Fig. 6 is a side elevational view of the structure of Fig. 5, showing the side opposite to that illustrated in Fig. 4.
Figure 7:
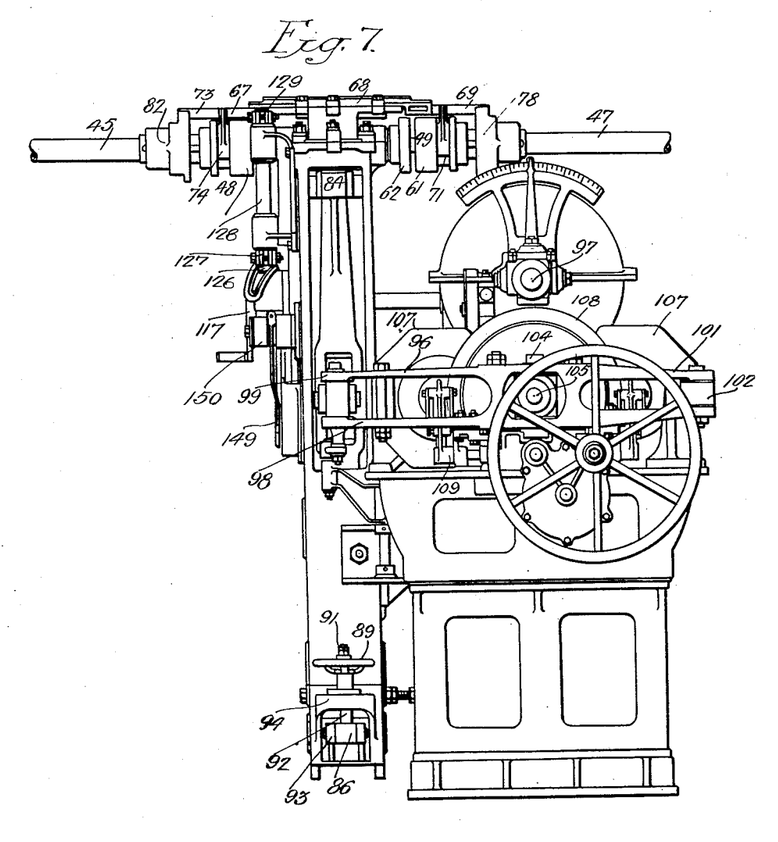
Figs. 7 and 8 are elevational views, of the structure of Fig. 5, looking respectively from the left and right.
Figure 8:
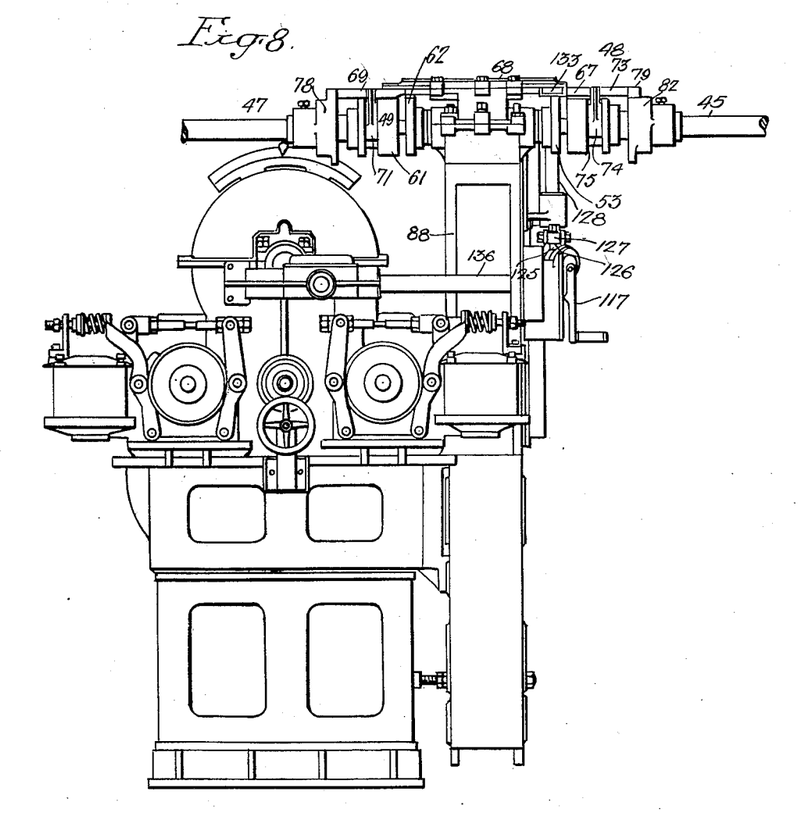

The quadrant 84 may be turned by a link 95 which is connected to a floating gear 96 constituting part of the pilot-motor operating means 6. The floating gear 96 as well as follow-up mechanism 97, which is associated therewith, is described and claimed in detail in the patent noted above. Briefly, the floating gear 96 comprises a floating lever 98, one end 99 of which is pivotally secured to the link 95. An opposite end 101 of the floating lever 98 is pivotally supported by means of a link 102 on a main supporting frame 103. The floating lever 98 is fulcrumed at an intermediate point 104 on a rotary longitudinally movable shaft section 105, as shown in Fig. 5. A rotary movement of the shaft section 105 may be effected by either one of a pair of pilot-motors 106 and 107 through a gearing 108 which is controlled by a mechanism 109. The pilot-motors 106 and 107 may be energized at will from a remote point, as for instance, a ship's bridge. An end portion 111 of the shaft 105 is threaded, and it engages a correspondingly threaded sleeve portion 112 of a rotary, follow-up shaft section 113. The section 113 is connected through a gearing 114 to a rotary follow-up shaft 115 which leads to rack-and-pinion mechanism 116 mounted on one of the moving parts of the fluid-motor apparatus 1, as shown in Figs. 1 and 3.

My invention still further contemplates means, as noted above, whereby the clutch shifter 67 and the distributing-valve apparatus 7 may be substantially simultaneously operated in accordance with a predetermined sequence from a single operating point. This desired result is accomplished as shown in detail in Figs. 12, 13 and 14, wherein a hand crank 117 is connected by gear-wheels 118, 119 and 121 to a quadrant 122 which is journaled on a bearing 123 mounted on an outside portion 124 of the housing 88. The movement of the quadrant 122, incident to the operation of the hand crank 117, is transmitted by means of a helical cam 125 and coacting roller 126 to an arm 127 mounted on a lower end of a vertical shaft 128. An upper end of the shaft 128 is provided with a horizontally extending arm 129, an inner end 131 of which is spherically curved so as to fit in a complementary recess 132 in a slidable block 133 mounted in a recess 134 in the clutch shifter 67, see Fig. 13a.

Movement of the hand crank 117 is also transmitted through the gear-wheels 118, 119 and 121 to a gear-wheel 135 which is connected by a shafting 136 to the distributing-valve apparatus 7, as illustrated in Figs. 2 and 11 to 14, inclusive. One end of the shaft 136 is connected to a plurality of valves 137 through a rack mechanism 138. Since the details of these valves do not constitute part of the present invention, further description is deemed unnecessary. It is noted, however, that these valves are so adjusted with respect to the shafting 136 that when the valves controlling the connection between the pumping unit 2 and the fluid-motor apparatus 1 are open, the control valves for the pumping unit 3 are closed. Conversely, when the control valves for the unit 3 are opened, the control valves for the unit 2 are closed. That is to say, while the control valves for both units may be simultaneously closed so as to disconnect entirely units 2 and 3 from the fluid-motor apparatus 1, only the control valves for one pumping unit may be opened at one time.

Figure 13:
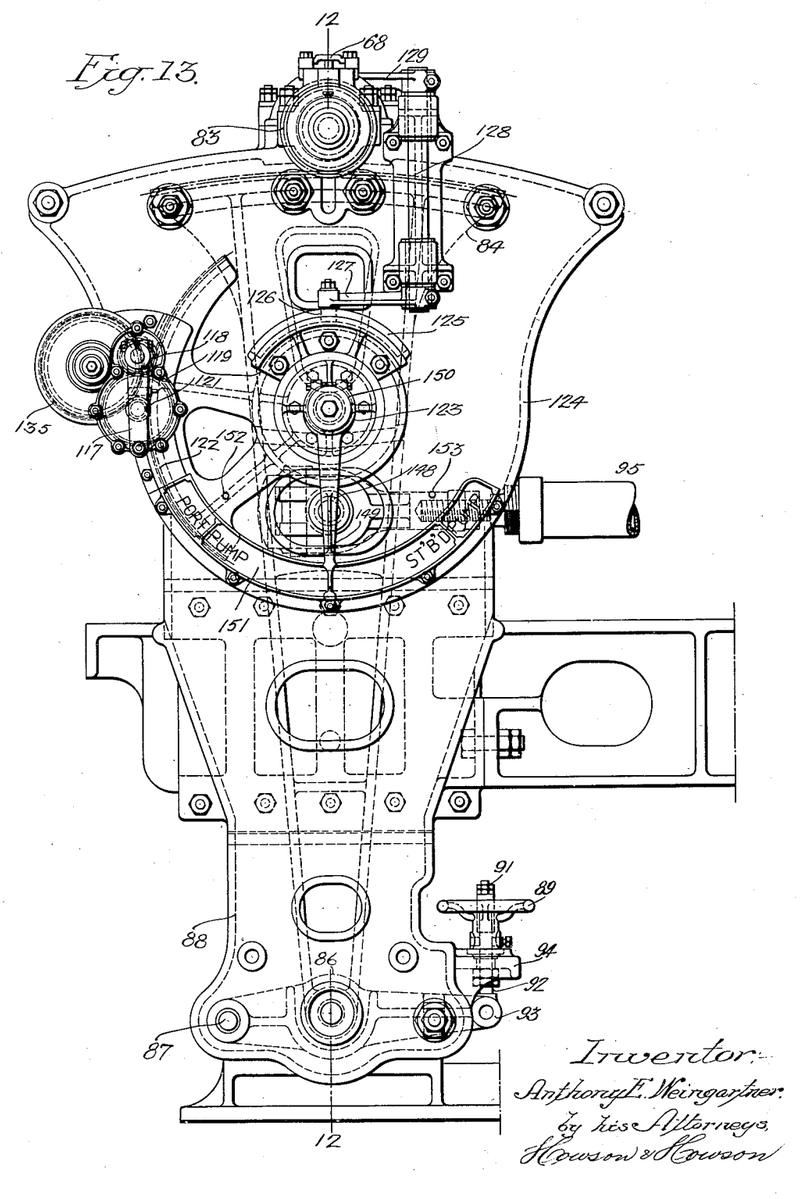
Fig. 13 is a side elevational view of the structure of Fig. 12, showing the common operating handle for the clutch-shifting mechanism and distributing-valve control means.
Figure 14:
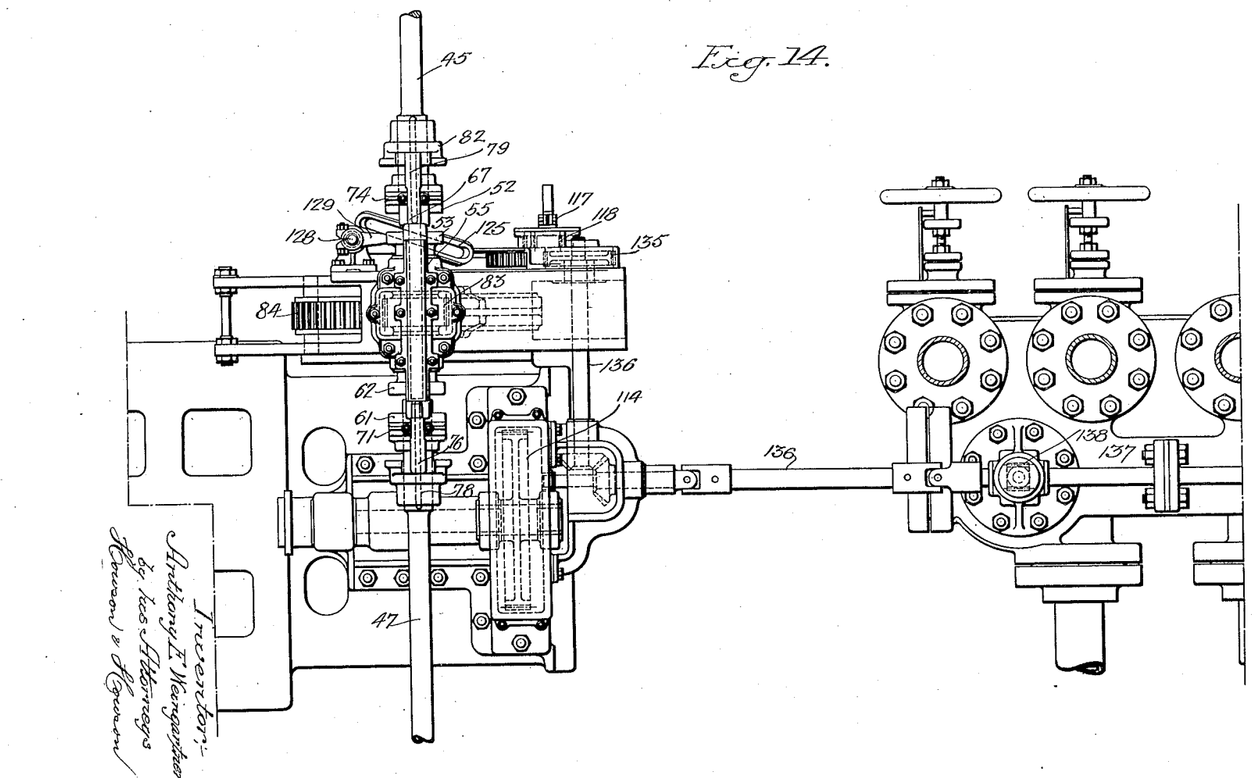
Fig. 14 is a top plan view of the structure shown in Fig. 13.
Figures 15, 16, 17:
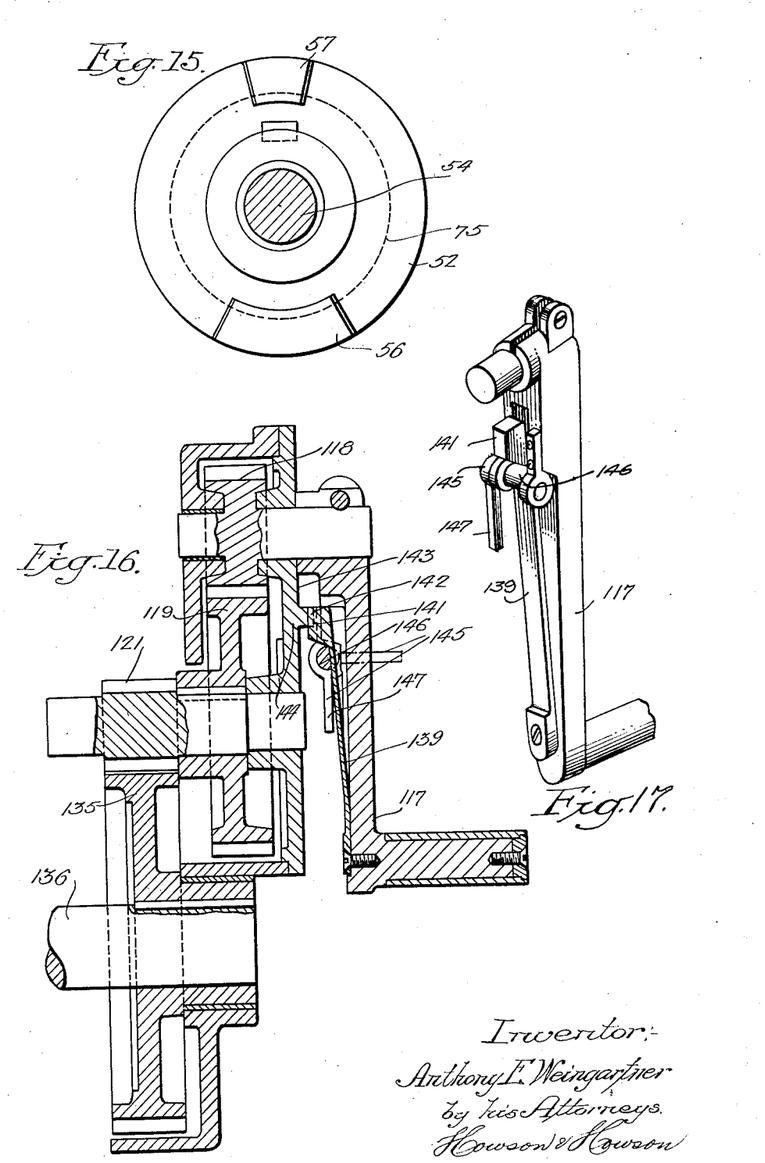
Fig. 15 is a transverse sectional view taken on the line XV—XV of Fig. 12.
Fig. 16 is an enlarged, vertical sectional view of the operating member for the interlocking mechanism extending between the clutches and the distributing-valve apparatus, together wtih the releasable locking member therefor.
Fig. 17 is a fragmentary perspective view of one of the elements of the hand-operating means.

Since it is desirable to lock the hand crank 117 in position when a desired adjustment between the clutch mechanism and the valve-distributing apparatus 7 has been made, I provide a flat spring 139 with an enlarged shoulder portion 141 on one end, the opposite end being rigidly secured, to the free end of the hand crank 117. The shoulder 141 under the action of the spring 139 normally tends to engage a recess 142 in an adjacent side 143 of a mounting plate 144 for the gear-wheels 118, 119 and 121 when the operating crank 117 occupies a desired vertical position, as shown in Fig. 13. When the shoulder 141 thus engages the recess 142, further movement of the operating crank 117 is prevented. The shoulder 141 may be actuated out of recess 142 to permit the operation of the hand crank 117 by a member 145 which comprises a cam portion 146 in direct engagement with the spring 139 and a hand portion 147, all as shown in Figs. 13, 16 and 17.

A still further feature of my invention is the provision of indicating means 148, whereby an operator may observe at a glance which pumping unit he has connected in operation. As shown in Fig. 13, a pointer 149 is mounted on a hub portion 150 of the quadrant 122, and it moves from a neutral position over a scale 151 bearing legends "port pump" and "starboard pump". The pointer 149 or some part of the mechanism movable therewith may also control the energization of the driving motor of the pumping unit which is to be put into service. Accordingly, stationary contacts 152 and 153 are respectively positioned in alignment with the scale legends "port pump" and "starboard pump" so as to be engaged by the pointer 149 when it has moved the required distance. The pointer 149 may be insulated from its associated parts so as to constitute a movable switch element, and it may be connected together with the contact members 152 and 153 to the pump driving-motors by electrical wiring, the details of which form no part of my present invention. The connections are such that, when the pointer 149 engages the stationary contact member 152, the driving-motor for the port pumping unit 2 is energized, and when the pointer 149 engages the contact member 153 the motor for the starboard unit 3 is rendered effective.

With the apparatus in the position shown in the drawings, it is noted that the pilot-motor 107 is connected to cause the turning of the shaft section 105 and the pilot-motor 106 is disconnected; that the clutches 48 and 49 are disengaged, while the clutch shifter 67 positively locks the pump spindles of the units 2 and 3 in their neutral position; and that the valves of the distributing-valve apparatus 7 are in their neutral position, wherein the pumping units 2 and 3 are disconnected from the fluid-motor apparatus 1.

Under such circumstances, when the pilot-motor 107 is energized by the closing of a switch, say, in the control bridge of a ship, the shaft section 105 turns and since the follow-up shaft section 112 is stationary, the rotary shaft section 105 is actuated bodily, causing the pivoting of the floating lever 98 and the consequent turning of the quadrant 84 and associated gear-wheel 83. This movement, however, is not transmitted to either of the clutch shafts 45 or 47, inasmuch as their clutches 48 and 49 are open.

Prior to the energization of the pilot-motor 107, the operator should connect in service one of the pumping units. Assuming it is desired to use the pumping unit 2, then the hand crank 117 is turned in a clock-wise direction until the pointer 149 is in alignment with the scale legend "port pump". When such alignment occurs, by reason of the interlocking of the several parts as described above, the clutch 48 is closed or engaged; the clutch 49 is disengaged; the shoulder 79 is out of engagement with the recess 81, permitting the free turning of the clutch shaft 45; and the shoulder 76 is still in the recess 77, thereby locking the starboard pumping unit 3 in the neutral position. In view of the mechanical connection between the actuating means for the clutch shifter 67 and the shafting 136 for controlling the distributing-valve apparatus 7, only the valves controlling port pumping unit 2 are opened and the valves controlling the starboard unit 3 remain closed. The pointer 149 also engages the contact member 152 closing the control circuit (not shown) for the port driving motor 22' and causing the operation of the latter.

Fluid is now supplied to the fluid-motor apparatus 1, causing the desired turning of the rudder post (not shown). The movement of the fluid-motor apparatus 1, however, is transmitted by the follow-up means 97 to the shaft section 112, causing the rotation of the latter. So long as the rate of rotation of the shaft sections 105 and 112 are equal, the further movement of the floating lever 98 is prevented. When the pilot-motor 107 is deenergized, the follow-up shaft section 112 only continues to turn. Such relative movement, however, causes a longitudinal movement of the shaft section 105 in a direction opposite to that originally occurring when the pumps 18 and 19 of the unit 2 were first started. As a result of this reverse movement, pump-control stems 23 and 24 are returned to their original neutral position and a further supply of fluid to the fluid-motor apparatus 1 is prevented. When it is desired to operate the fluid-motor apparatus 1 in the opposite direction, the pilot-motor 107 is merely energized in the reverse direction and the foregoing operation is repeated.

Should the port pumping unit 2 fail for any reason, the operator may easily and quickly disconnect the unit 2 and connect the unit 3 in the system merely by first releasing the hand crank 117 by turning the locking member 145 and thereafter turning the hand crank 117 until the pointer 149 is in alignment with the scale legend "starboard pump". At this time, contact is established between the pointer 149 and the contact member 153, resulting in the energization of the driving motor for the starboard pump unit 3. The system may then again be operated from a remote point merely by the energization of either one of the two pilot-motors 106, 107, depending upon which pilot motor is connected to the rotary shaft section 105.

While I have shown only one embodiment of my invention, for the purpose of describing the same and illustrating its principles of construction and operation, it is apparent that various changes and modifications may be made therein, without departing from the spirit of my invention and I desire, therefore, that only such limitations shall be imposed thereon, as are indicated in the appended claims or as are demanded by the prior art.

I claim:

1. A pair of pumps having control elements, distributing-valve apparatus for said pumps variably adjustable for individual operation with the said pumps, operating means for said control elements, means for connecting said operating means to one or the other of said elements, and means connected to said last-mentioned means for adjusting said distributing-valve apparatus.

2. The combination with a pair of pumps having control elements, of floating gear for operating said elements, means for controlling the connection of said gear to said elements, distributing-valve apparatus for said pumps having individual adjustments for said pumps respectively, and means responsive to the operation of said first-mentioned means for insuring a predetermined adjustment of said distributing-valve apparatus.

3. A pair of pumps having control elements, operating means, means for connecting said operating means to one or the other of said control elements, valve apparatus connected to and having individual adjustments for said pumps, and operating means for said valve apparatus responsive to said second-mentioned means, whereby a predetermined relation between said pumps and said valve apparatus may be assured.

4. In combination, a pair of pumps, distributing-valve apparatus for said pumps having an individual adjustment for each pump, control elements for said pumps, operating means, means for selectively connecting said operating means to one or the other of said control elements, and means responsive to said last-mentioned means for insuring a proper relative adjustment of said valve apparatus and the element connected to said operating means.

5. In combination, a pair of pumps having control means, operating means, means for selectively connecting said operating means to one or the other of said control means, and means for insuring the inoperation of the unconnected control means.

6. The combination with a pair of pumps having control means, of operating means, means for causing said operating means to actuate a desired one of said pump-control means and for rendering ineffective the other of said pump-control means, valve apparatus having an individual adjustment for each pump, and operating means for said valve apparatus interlocked with said third-mentioned means and insuring a proper relative adjustment of valve and pump.

7. The combination with a plurality of pumps having control means, of operating means for said control means, valve apparatus for said pumps having an individual adjustment for each pump, and means whereby one of said pump-control means may be actuated by said operating means and another of said pump-control means locked in position, said means also serving to adjust said valve apparatus, so that a desired relation between at least one of said pumps and said valve apparatus may be assured.

8. The combination with a plurality of pumps having control means, of operating means, means including clutch mechanism, whereby said operating means may be connected to one or another of said pump-control means, distributing-valve apparatus for said pumps having an individual adjustment for each pump, and means whereby a desired relative adjustment may be maintained between said pumps and said valve apparatus.

9. In combination, a pair of pumps having control means, operating means for said control means, means including clutch mechanism for operatively associating said operating means and one of said pump-control means and for causing the locking in position of another of said pump-control means, valve apparatus having an individual adjustment for each pump, and control means for said valve apparatus interlocked with said third-mentioned means whereby a proper relative adjustment between the pumps and the valve apparatus is maintained.

10. Apparatus of the character described comprising a plurality of pumps having control means, operating means, means including clutch mechanism for operatively associating said operating means and one of said pump-control means and for preventing the operation of another of said pump-control means, adjustable distributing-valve apparatus for said pumps, and control means for said valve apparatus so interlocked with said third-mentioned means as to maintain a predetermined relation between said valve apparatus and said pumps.

11. A pair of pumps having control elements, a pair of clutches, operating means for said control elements individually connectible with the elements by said clutches, valve apparatus operatively associated with and having individual adjustments for each pump, actuating means for said clutches, and control means for said valve apparatus interlocked with said clutch-actuating means.

12. A pair of pumps having control elements, common operating means for said control elements, a pair of clutches respectively positioned between said control elements and said common operating means, means for so actuating said clutches that one is engaged and the other is disengaged, and means whereby the control element associated with the disengaged clutch may be mechanically locked in position.

13. The combination with a pair of pumps having control elements of common operating means for said control elements, a pair of clutches respectively positioned between said control elements and said common operating means, means for so actuating said clutches that one is engaged and the other is disengaged, means whereby the control element associated with the disengaged clutch may be mechanically locked in position, distributing valve apparatus for said pumps having an individual adjustment for each pump, and control means for said apparatus mechanically interlocked with said clutch-actuating means.

14. A pair of pumps having control elements, a common operating member, clutches respectively positioned between said control elements and said common operating member, shafts connected to said clutches, means for causing the engagement of one clutch and the disengagement of the other, and means whereby the shaft connected to the disengaged clutch may be positively locked substantially simultaneously with the operation of said clutch-actuating means.

15. A pair of pumps having control elements, a common operating member, clutches respectively positioned between said common operating member and said pump-control element, a clutch shifter, and means co-operating with said clutch shifter, whereby said pump-control elements may be mechanically locked in position when said clutches are disengaged.

16. In a system of the character described, the combination with a pair of pumps having control elements, of common operating means for said elements including a pair of gear-wheels, of which one is movable into a disengaged position so as to render ineffective said operating means, clutches for connecting the said elements with the operating means, and means whereby said clutches may be selectively rendered effective and ineffective.

17. In apparatus of the character described, the combination with a power apparatus to be controlled, of a floating control gear therefor, a clutch, a pair of gear-wheels positioned intermediate said floating gear and said power apparatus, means whereby said gear-wheels may be disengaged, and actuating means for said clutch, whereby said floating gear may be further disengaged from said power apparatus.

18. In apparatus of the character described, a floating lever, a pump-control element, a gear-wheel connected to said floating lever so as to be actuated thereby, and a second gear-wheel meshing therewith, said second gear-wheel being operatively associated with said pump-control element.

19. Apparatus of the character described comprising a pump-control element, a floating lever, a gear-wheel, a link extending between said floating lever and said gear-wheel, and a second gear-wheel in mesh with said first-mentioned gear-wheel and operatively associated with said pump-control element.

20. In apparatus of the character described, a power device having control means, operating means for said control means, means whereby said operating means and said control means may be connected and disconnected at will, said means including a manually operable member, and means whereby said member may be releasably locked in a desired position.

21. Apparatus of the class described comprising a quadrant adapted to be connected to the floating gear of a pump-control system, a pinion in mesh with said quadrant, a pair of control elements, clutches for respectively connecting said pinion and said control elements, a clutch shifter, a manually operable member, means for operatively associating said clutch shifter and said manually operable member including gear-wheel mechanism and a cam, and means for indicating the position of said clutch shifter.

22. In combination, a gear-wheel adapted to be connected to the floating gear of a pump-control system, a pinion in mesh with said gear-wheel, a pair of control elements, clutches for respectively connecting said pinion and said control elements, a clutch shifter, a manually operable member, means for operatively associating said clutch shifter and said manually operable member including a cam, means for indicating the position of said clutch shifter, and means for releasably locking said manually operable member in a desired position.

23. Apparatus of the character described comprising a pair of pump units adapted for selective operation to deliver fluid to a predetermined objective, control means for said units, distributing valve mechanism for individually connecting the units with said objective, and a common actuator for the said control means and valve mechanism whereby actuation of the respective pumps effects corresponding and differing adjustments of the valve mechanism.

ANTHONY E. WEINGARTNER.